United States Patent [19]

Smith

[11] 4,117,680
[45] Oct. 3, 1978

[54] CONTINUOUS LOOP SHAPE MEMORY EFFECT HEAT ENGINE

[75] Inventor: Ronald H. Smith, San Francisco, Calif.

[73] Assignee: Solergy, Inc., San Francisco, Calif.

[21] Appl. No.: 748,312

[22] Filed: Dec. 7, 1976

[51] Int. Cl.² ............................................. F03G 7/06
[52] U.S. Cl. ...................................................... 60/527
[58] Field of Search .......................... 60/527, 529, 528; 337/333; 318/117

[56] References Cited

U.S. PATENT DOCUMENTS 3,316,415  4/1967  Taylor ................................ 60/529 X
4,010,612  3/1977  Sandoval .............................. 60/527

Primary Examiner—Allen M. Ostrager
Attorney, Agent, or Firm—Flehr, Hohbach, Test, Albritton & Herbert

[57] ABSTRACT

Heat engine having a continuous band of thermally responsive shape memory material disposed in rolling engagement with one or more shafts. Below a transition temperature the band is ductile, but above that temperature the band tends to return abruptly to a shape impressed upon the band by heat treatment. The band is heated above and cooled below the transition temperature at points chosen to produce a force which imparts a rotation to at least one of the shafts.

4 Claims, 6 Drawing Figures

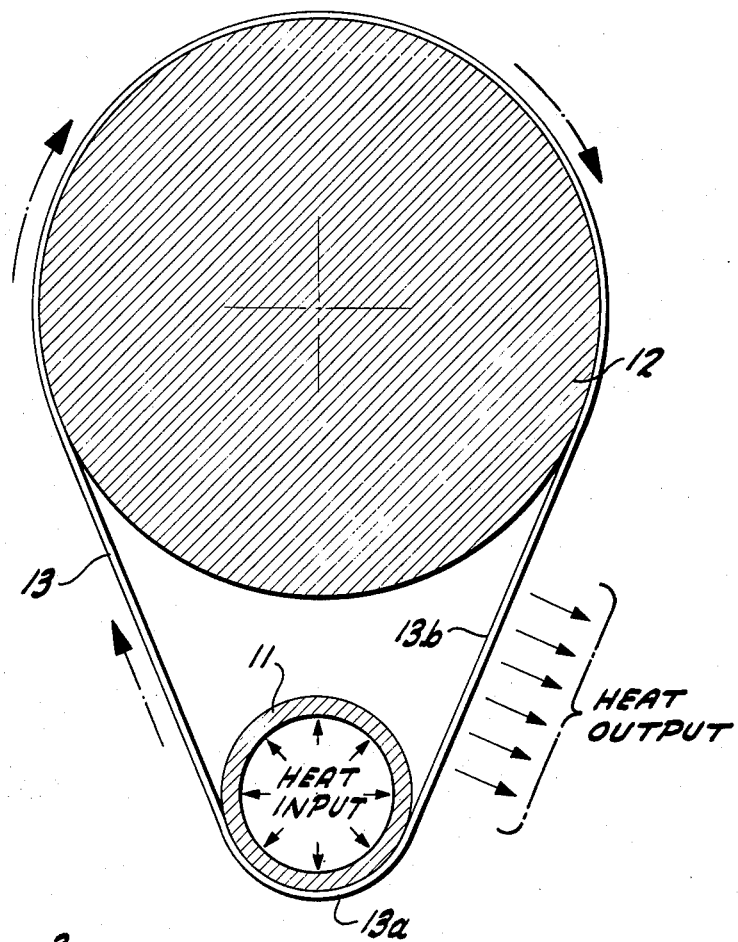
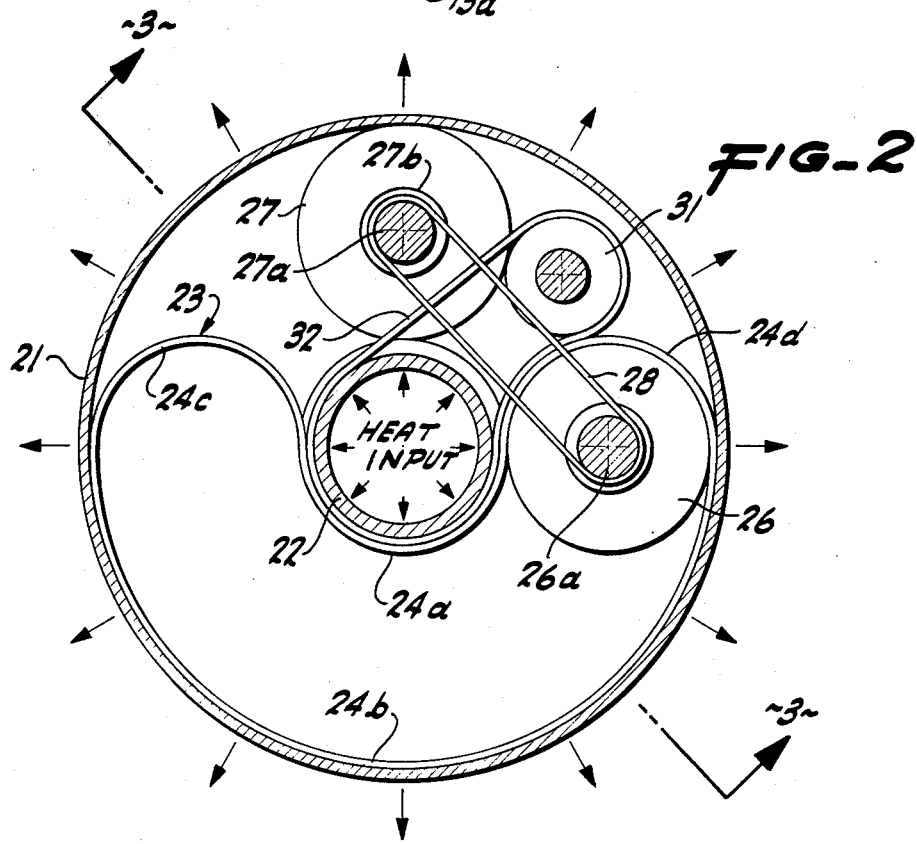

CONTINUOUS LOOP SHAPE MEMORY EFFECT HEAT ENGINE

BACKGROUND OF THE INVENTION

This invention pertains generally to heat engines and more particularly to a heat engine utilizing a thermally responsive shape memory material.

Certain materials have been found to exhibit what is known as a "shape memory effect". Once impressed with a given shape by heat treatment, these materials tend to return abruptly to that shape when heated above a transition temperature. Below this temperature, the materials are highly ductile and can be deformed with substantially less force than that developed by the materials in returning to their annealed shapes.

One material which exhibits a shape memory effect is an alloy of Ni and Ti, known as "55 Nitinol". This alloy typically contains on the order of 55% Ni, by weight, and the balance Ti.

Heretofore, there have been some attempts to build heat engines utilizing shape memory materials. One such engine is described in U.S. Pat. No. 3,913,326, dated Oct. 21, 1975. This engine has a plurality of spoke-like elements of the memory material connected between a stationary pivot and a rim-like rotor which rotates about a fixed axis disposed eccentrically of the stationary pivot. The thermally responsive elements are heated on one side of the wheel and cooled on the other to produce a torque about the fixed axis.

SUMMARY AND OBJECTS OF THE INVENTION

The invention provides a heat engine utilizing a continuous band of shape memory material. The band is disposed in rolling engagement with one or more shafts and heated and cooled at points chosen to produce a force in the band which causes at least one of the shafts to rotate. In one embodiment, the band is trained about parallel shafts, and heat is applied through one of the shafts and extracted in a reach of the band between the shafts. In another embodiment, the band is constrained in a loop between a shaft and a coaxial retaining wall, and heat is applied toward one end of the loop. In a third embodiment, a plurality of bands are utilized in a multistage engine.

It is in general an object of the engine to provide a new and improved heat engine.

Another object of the invention is to provide a heat engine of the above character utilizing a continuous band of shape memory material.

Another object of the invention is to provide a heat engine of the above character in which the band of shape memory material is in rolling contact with the other elements of the engine.

Additional objects and features of the invention will be apparent from the following description in which the preferred embodiments are set forth in detail in conjunction with the accompanying drawings.

BRIEF DESCRIPTION OF THE DRAWINGS

FIG. 1 is a diagrammatic sectional view of one embodiment of a heat engine incorporating the invention.

FIG. 2 is a diagrammatic sectional view of a second embodiment of a heat engine incorporating the invention.

DESCRIPTION OF THE PREFERRED EMBODIMENTS

Figure 3:
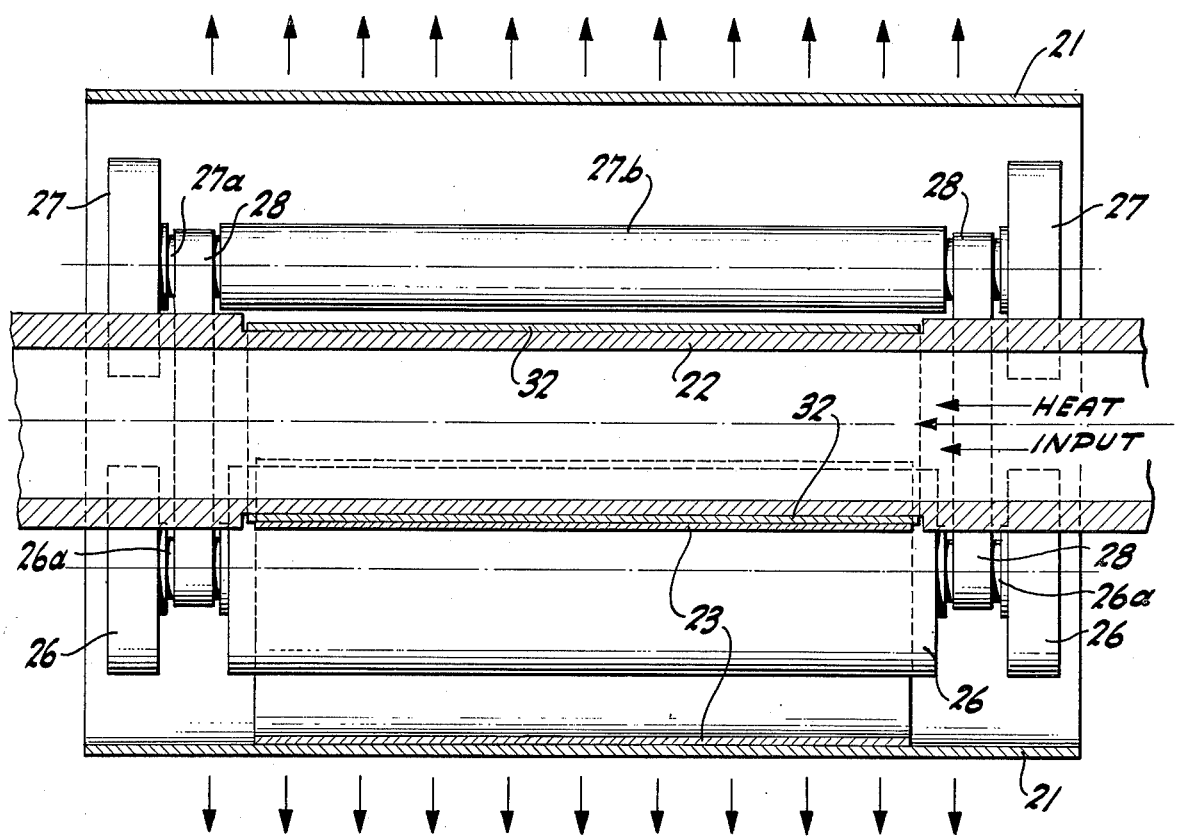
FIG. 3 is a cross-sectional view taken along line 3—3 of FIG. 2.

The embodiment illustrated in FIG. 1 includes shafts 11, 12 mounted for rotation about stationary parallel axes by suitable means (not shown) such as anti-friction bearings. As illustrated, shaft 11 is of substantially smaller diameter than shaft 12 and is a hollow shaft.

A continuous band 13 of a suitable shape memory material such as 55 Nitinol is trained tautly about the shaft. Prior to mounting on the shafts, band 13 is impressed with a circular shape by heating the band to an annealing temperature, such as 600° C., and forming the band to the desired shape. Thereafter, when the band is heated above a transition temperature, it will tend to return abruptly to the annealed shape. The transition temperature is substantially below the annealing temperature and is dependent upon the composition of the material of the band. In the present invention, the composition of the 55 Nitinol band is preferably such that the transition temperature is on the order of 50° C. to 150° C.

Means is provided for heating one portion of the band above the transition temperature and cooling another portion of the band to produce a force which causes the shafts to rotate. In the embodiment illustrated, shaft 11 is heated by suitable means such as the passage of a heated fluid through the hollow portion of the shaft, and heat is transferred to the portion 13a of the band trained about the shaft. Heat is removed by cooling the reach 13b of the band between the shafts. The heat removal can be effected, for example, by passing water, air or another suitable coolant over the surface of the band in the region of reach 13b.

Operation and use of the engine shown in FIG. 1 is as follows. As the band approaches shaft 11 and reach 13b is cooled below the transition temperature, this portion of the band becomes highly ductile and offers little resistance to deformation about shaft 11. As the band passes about shaft 11 and is heated above the transition temperature, the heated portion of the band wants to return to the circular shape impressed by annealing. This produces a force in the band which is applied to the shafts, causing the shafts to rotate in the clockwise direction, as viewed in FIG. 1. In this embodiment, work output is preferably taken from shaft 12, although it can also be taken from shaft 11.

The embodiment of FIGS. 2–3 includes a cylindrical retaining wall 21 mounted in a stationary position and a hollow shaft 22 extending coaxially of the retaining wall. A band 22 of a suitable shape memory material such as 55 Nitinol is constrained between shaft 22 and wall 21 in an arcuately bowed loop 24 having oppositely disposed side portions 24a, 24b conforming to the curvatures of shaft 22 and wall 21, respectively, and generally semicircular end portions 24c, 24d adjoining the side portions. The band is annealed with a circular shape corresponding to the contour of wall 21.

Rollers 26, 27 serve to maintain shaft 22 at the axis of wall 21. Each of these rollers has a diameter corresponding to the difference between the radii of the wall and shaft. Roller 26 is positioned within end portion 24d of loop 24, and roller 27 is positioned outside the loop in peripheral engagement with the shaft and wall. The rollers are held together in a rolling relationship by bands 28 trained about portions of reduced diameter 26a, 27a of the rollers. As best seen in FIG. 3, bands 28 are spaced axially apart and embrace band 23.

Means is provided for heating a portion of band 23 toward loop 24d to a temperature above the transition temperature. This means includes an additional roller 31 parallel to shaft 22 and a band of thermally conductive material 32 trained about the shaft and roller 31. As illustrated, roller 31 bears against rollers 26, 27 and band 32 engages the outer surface of band 23 in the region of shaft 22 and roller 26. The central portion 27b of roller 27 is of reduced diameter to provide clearance for band 32. At this point, it can be noted that band 32 cooperates with band 28 to maintain the shaft and rollers in a stable position without restricting the rotation thereof.

Shaft 22 is heated by suitable means such as passing a hot working fluid through the central opening thereof, and heat is transferred from the shaft to band 23 via band 32 in the region of shaft 22 and roller 26. Heat is removed from the portion of band 23 in contact with wall 21 by cooling the wall. This cooling can be effected by any suitable means such as passing a coolant over the outer surface of the wall or through cooling passages formed in the wall.

Figure 4A:
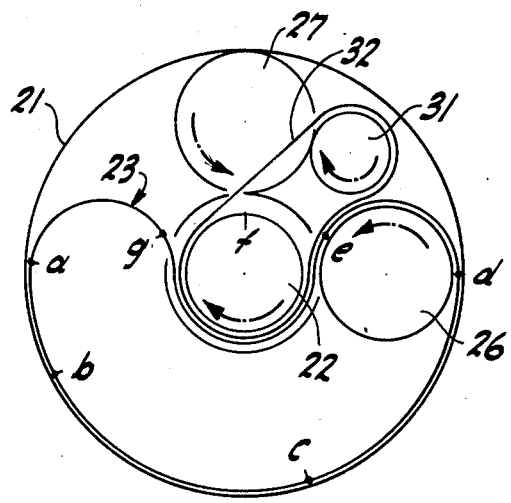
FIGS. 4A and 4B are operational views, illustrating the operation of the embodiment of FIGS. 2–3.
Figure 4B:
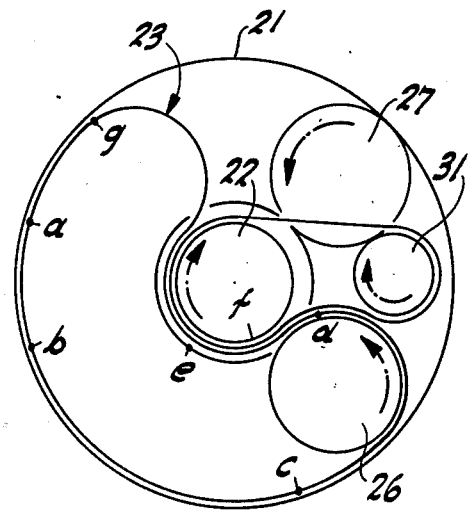

Operation and use of the embodiment of FIGS. 2–3 is as follows. Shaft 22 is heated to a temperature above the transition temperature of band 23, and the heat is transferred to band 23 by band 32. Heat is removed from band 23 in the region of contact with wall 21. When the heat is first applied, end portion 24c is heated more rapidly than end portion 24d because some heat is conducted away from portion 24d by roller 26. The net result of the heating and cooling is that end portion 26b is initially heated above the transition temperature, while end portion 24d remains below this temperature. The heated portion of the band tends to return to the curvature of wall 21, and in region 24c the band unbends and rolls onto the wall. At the other end of the loop, the band is drawn away from the wall and trained about roller 26. Thus, the band travels around loop 24 in a counterclockwise direction, as viewed in FIG. 3, and the band and rollers 26, 27 and 31 advance as a unit in the clockwise direction, as illustrated in FIGS. 4A–4B. As the band advances around the loop, the portions previously trained about shaft 22 and in contact with wall 21 move into regions 24c and 24d, respectively, enhancing the heating and cooling in those regions. The motion continues as long as heat is applied to the shaft and removed from the wall. The rolling band imparts a clockwise rotation to shaft 22, and work output can be taken from the shaft.

Figure 5:
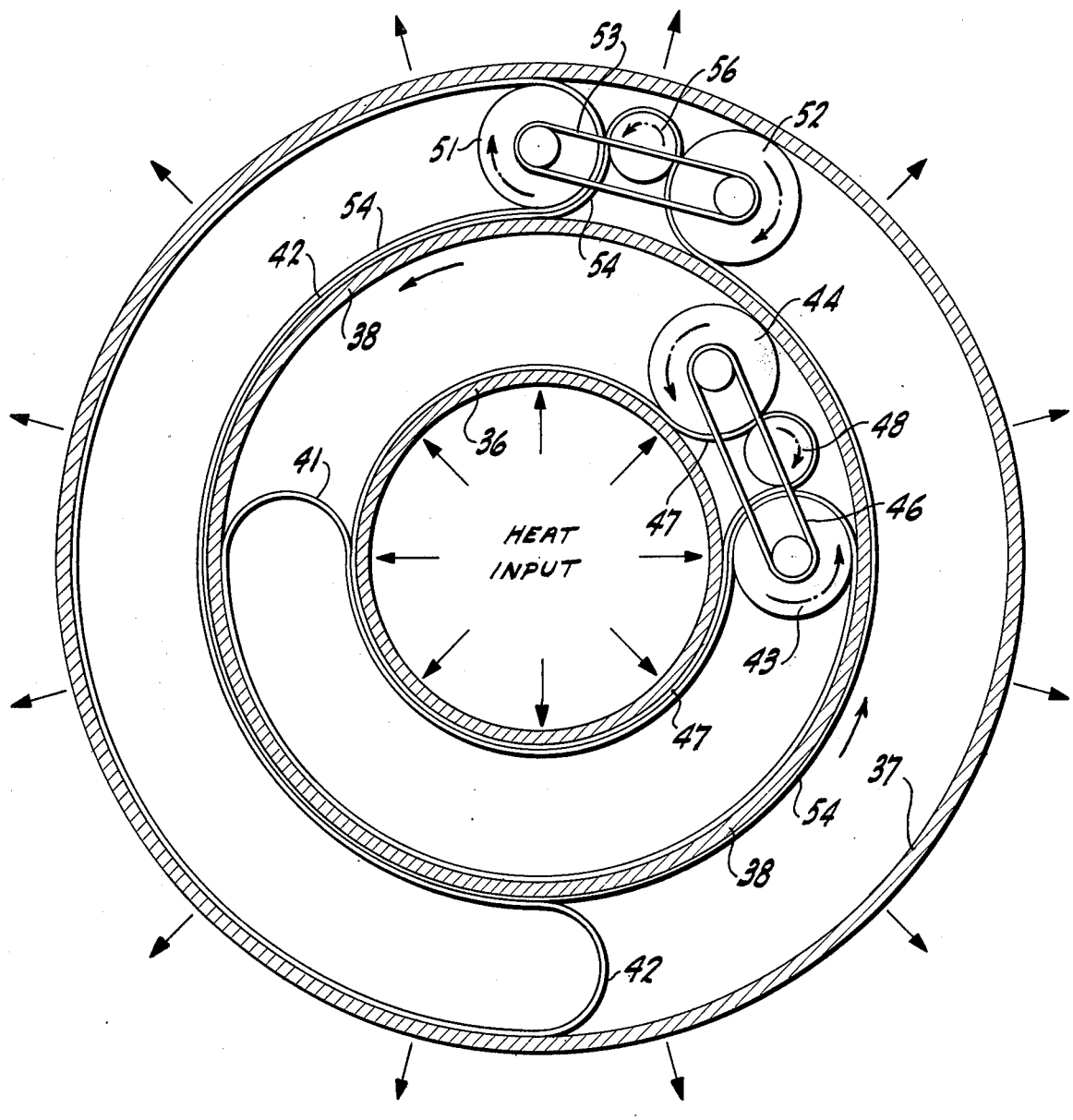
FIG. 5 is a diagrammatic view of another embodiment of the invention.

The embodiment illustrated in FIG. 5 is a two stage engine having a central mandrel 36, an outer retaining wall 37 disposed coaxially of the mandrel, and a cylindrical shaft 38 intermediate the mandrel and wall. Mandrel 36 and wall 37 are mounted in fixed positions, and shaft 38 is free to rotate.

A first band of shape memory material 41 is constrained between mandrel 36 and the inner surface of shaft 38, and a second band of shape memory material 42 is constrained between the outer surface of the shaft and the inner surface of wall 37. These bands are generally similar to band 23, with band 41 having a memory shape corresponding to the curvature of shaft 38 and band 42 having a memory shape corresponding to the curvature of wall 37.

Rollers 43, 44 are provided for band 41 and are similar to rollers 26, 27. These rollers are held together by bands 46, and a heat conductive band 47 is trained about the mandrel and an additional roller which bears against rollers 43, 44.

Rollers 51, 52 are provided for band 42 and are similar to rollers 26, 27. These rollers are held together by bands 53, and a thermally conductive band 54 is trained about shaft 38 and a roller 56 which bears against rollers 51, 52.

Mandrel 36 is a tubular member, and heat is applied to the mandrel by passing a hot fluid through the opening therein. Outer wall 37 is cooled to a temperature below the transition temperature of the bands by suitable means such as passing a coolant over the outer surface of the wall or through passageways formed in the wall.

Operation and use of the embodiment of FIG. 5 is as follows. Heat applied to mandrel 36 is transferred via band 47 to the portion of band 41 in contact with band 47. The portion of band 41 in contact with shaft 38 is cooled by transfer of heat from the band to the shaft. From the shaft, the heat is transferred by band 54 to the portion of band 42 in contact with band 54. The portion of band 42 in contact with wall 37 is cooled by the transfer of heat to the wall. The heating of band 41 causes that band to roll around mandrel 36 in the counterclockwise direction, imparting a counterclockwise rotation to shaft 38. The heating of the portion of band 42 trained about roller 51 causes that band to roll about wall 37 in the counterclockwise direction, adding to the rotation of shaft 38.

The invention is particularly suitable for use with a thermal energy collector as a heat input source. One such collector is described in U.S. Pat. No. 3,974,824, issued Aug. 17, 1976, to the assignee herein. In such a device, a working fluid passing through an absorber pipe is heated by solar energy concentrated by a suitable collector. In many applications, the absorber pipe can be connected directly to the shaft or mandrel through which heat is applied to the engine, and in some cases the absorber pipe can also serve as the shaft or mandrel. This combination is particularly advantageous for producing electrical energy when the absorber is enclosed in a sealed and evacuated enclosure. The engine can be connected to a generator within the enclosure, and the only connection which must be made through the enclosure is the electrical connection to the generator output. Such connections are readily sealed.

The invention has a number of important features and advantages. In all embodiments, the engine is highly stable and delivers a continuous work output. The engine is highly efficient since the only resistance to motion is rolling friction and the stiffness of the working band. The need for lubrication is eliminated, and consequently the engine can be utilized in a vacuum or other environment where lubrication would be impossible. Moreover, the rotation of the shaft carrying the heated working fluid can be utilized to provide pumping and heat regulation of the fluid.

It is apparent from the foregoing that a new and improved heating engine has been provided. While only certain presently preferred embodiments have been described, as will be apparent to those familiar with the art, certain changes and modifications can be made without departing from the scope of the invention as defined by the following claims.

What is claimed is:

1. In a thermal engine: first and second relatively rotatable bodies having circular external and internal contours, respectively, said first body being positioned within said second body, a band of thermally responsive shape memory material constrained between the first and second bodies and tending to return generally to the internal contour of the second body when heated above a predetermined temperature, means for applying heat energy to the first body, and a flexible band of thermally conductive material trained about the first body and engaging a portion of the band of shape memory material between the first and second bodies for transferring heat energy from the first body to the band of shape memory material.

2. The engine of claim 1 further including a shaft disposed coaxially within the first body, a second band of thermally responsive shape memory material constrained in an arcuately bowed loop between the shaft and the inner surface of the first body, and means for heating a portion of the second band toward one end of the loop formed thereby, the second body and the shaft being held stationary and the bands of shape memory material both tending to produce rotation of the first body.

3. The thermal engine of claim 1 wherein the bodies are coaxially disposed.

4. In a thermal engine: first and second relatively rotatable bodies having circular external and internal contours, respectively, said first body being positioned within and concentric to said second body; first and second rollers bearing against the first body and constrained for rotation about axes spaced a predetermined distance apart; a third roller bearing against the first and second rollers; a band of thermally responsive shape memory material constrained between the first and second bodies and tending to return generally to the internal contour of the second body when heated about a predetermined temperature, said band being formed in a loop having an outer reach in rolling engagement with the second body, an inner reach conforming generally to the contour of the first body, and an end portion trained about the first roller; a flexible band of thermally conductive material trained about the first body and the third roller in direct thermal contact the inner reach and the end portion of the loop of shape memory material; and means for applying thermal energy to the first body, said energy being transferred to the band of shape memory material by the thermally conductive band to cause the band of shape memory material to bear against the first and second bodies to produce relative rotation of said bodies.

* * * * *